(12) United States Patent
Dumitru et al.

(10) Patent No.: US 7,266,550 B2
(45) Date of Patent: Sep. 4, 2007

(54) MANAGING APPLICATION STATUS INFORMATION FOR A COMPUTER APPLICATION

(75) Inventors: Marius M. Dumitru, Leimen (DE); Robert B. Fuhge, Bensheim (DE); Ute M. Stiegeler, Weingarten (DE)

(73) Assignee: SAP Aktiengesellschaft, Walldorf ( * ) Notice: Subject to any disclaimer, the term of this patent is extended or adjusted under 35 U.S.C. 154(b) by 451 days.

(21) Appl. No.: 10/766,184

(22) Filed: Jan. 29, 2004

(65) Prior Publication Data
US 2005/0171950 A1    Aug. 4, 2005

(51) Int. Cl.
*G06F 7/00* (2006.01)
(52) U.S. Cl. .......................................... 707/4
(58) Field of Classification Search ............... 707/4–10, 707/100
See application file for complete search history.

(56) References Cited

U.S. PATENT DOCUMENTS

| | | | | |
|---|---|---|---|---|
| 5,812,776 | A | * | 9/1998 | Gifford ....................... 709/217 |
| 6,460,071 | B1 | | 10/2002 | Hoffman ..................... 709/203 |
| 2004/0250059 | A1 | * | 12/2004 | Ramelson et al. .......... 713/150 |

\* cited by examiner

*Primary Examiner*—Wilson Lee
(74) *Attorney, Agent, or Firm*—Fish & Richardson P.C.

(57) ABSTRACT

Generally, the invention provides the capability to store and use web application status information for each web page dynamically generated and transmitted to a web browser in a communications session. The status information is stored so that it may be later retrieved and used to reset the status of the web application each time requests are generated by action taken while the page is displayed. Resetting the status each time action is taken from the web page ensures that the corresponding request produces the same results every time that it is submitted, as is expected by the user.

19 Claims, 6 Drawing Sheets

MANAGING APPLICATION STATUS INFORMATION FOR A COMPUTER APPLICATION

TECHNICAL FIELD

This description relates to storing and using status information related to a software application running on a computer system accessible through a network.

BACKGROUND

The Internet is an international collection of interconnected networks of computer systems. The World Wide Web is a portion of the Internet that allows a user of one computer system to access electronic documents or pages that are stored on another computer system. The World Wide Web also may be referred to as the WWW, web, or W3, and the accessible electronic pages may be referred to as web pages or, more simply, pages. Often a web page includes text, graphics, sounds other types of multimedia information, and data fields. A web page also may include links, called hyperlinks, to files and documents accessible on other web pages. The computer systems on which the accessible web pages are stored may be referred to as web sites or web servers.

Computer system users can access, download and display web pages from web sites using a graphical user interface (GUI) produced by executing client software called a browser application. A browser application also may be referred to as a web browser or simply, a browser. Examples of commercially available web browsers include Netscape® available from AOL/Netscape Communications of Mountain View, Calif.; Internet Explorer™ available from Microsoft Corporation of Redmond, Wash.; and Safari available from Apple Computer of Cuppertino, Calif. Web browsers may use a variety of protocols for accessing and communicating with web sites. One example of such a protocol is the HyperText Transfer Protocol (HTTP).

To access a web page at a web server, a user enters the address associated with the web page in the web browser. The web browser retrieves the web page for display on the user's computer system by submitting a request for a web page to a web server. The web server retrieves a static page or creates a dynamic page for transfer to the web browser. The web browser receives and displays the web page on the user's computer system. A computer system user may use navigation buttons in the web browser to control the display of web pages. Typically, a web browser includes "back" and "forward" navigation buttons that enable a user of the web browser to navigate through a sequence of web pages. A computer system user also may use a hyperlink to display a web page or a button to execute a computer program on the web server that is used to create and transmit a web page for display by the web browser.

A web application is a computer program running on a web server. Some web applications are capable of dynamically building web pages upon receiving requests from a web browser. A web browser running on the client system displays the web pages created by the web application. The web application creates the web pages based on the request and an internal state or condition of the web application at the time that the web page is created. The process of creating a web page may change the internal state of the web application.

One challenge facing developers of web applications is in creating a web application in which a user is able to navigate through a series of dynamically generated web pages. This is generally not a problem when a user navigates forward through linked web pages or uses hyperlinks to navigate to a specified web page. However, under some conditions, the web application may fail to return a web page or may return a web page that is different than the user was expecting. This may be because a dynamically generated web page is generated based on the internal state of the web application at the time the web page is generated. If the internal state of the web application is different, an action on a web page may produce different results, which may surprise or frustrate a user.

In one example, a user may navigate back to a previously viewed web page and then navigate forward following the same sequence of actions that the user previously performed. In such a case, the user typically expects to see the same web pages that the user previously viewed when following the same navigation path. However, if the internal state of the web application has changed from what the internal state was when the user first traversed the navigation path, different web pages may be displayed in the user's subsequent traversal of the same navigation path. By way of example, when a user of the web browser uses the web browser's "back" button to go back to a web page that was generated based on an earlier search request, the same search request is resubmitted to the web application. The user typically expects the web page returned in response to the resubmission of the search request to be exactly the same as the web page that was returned and viewed as a result of the first search request. However, the web page created by the web application in response to the resubmission of the search request may be different because the internal state of the web application at the time of the resubmission was different than the internal state of the web application at the time that the first search was submitted.

One approach to managing application state information is to store, on a web server, state data in association with a reference handle. The application state information is stored and retrieved in response to a web server request.

SUMMARY

Generally, the invention provides the capability to store and use web application status information for each web page dynamically generated and transmitted to a web browser in a communications session. The status information is stored so that it may be later retrieved and used to reset the status of the web application each time requests are generated by action taken while the page is displayed. Resetting the status each time action is taken from the web page ensures that the corresponding request produces the same results every time that it is submitted, as is expected by the user.

In particular, the application status information is stored in association with an identifier that is used to retrieve the stored application status information. In one implementation, the identifier uniquely identifies a dynamically generated web page. The page identifier is included with the web page created by the web application in response to the request from the web browser and sent to the web browser from which the request was received. Later in the same communications session, when the web browser sends a request to the web server from the received web page, the web browser includes the page identifier received with the web page. The web application running on the web server uses the page identifier to retrieve the application status information and sets the status of the web application to an internal state indicated by the retrieved application status information. Only then does the web application create a page in response to the request. The web application then stores the current internal state as another set of application status information in association with another identifier, which the web application sends to the web browser in response to the request. The cycle of request/response continues with a repetition of the process—namely, the web application receives, with a request, a page identifier that identifies stored application status information, sets the internal state of the application to reflect the application state information identified by the received identifier, dynamically generates a web page to fulfill the request only after setting the internal state of the application, associates a page identifier with application status information, and sends the page identifier and dynamically generated web page to the web browser.

In one general aspect, processing a request received from a network browser includes receiving a request having a unique identifier value that is associated with an application status entry. An application status entry is identified in which the application status entry includes a unique identifier value that matches the received unique identifier value. The application status information included in the identified application status entry is used to set an internal state of an application. The received request is processed only after the internal state of the application is set based on the application status information of the identified application status entry.

Implementations may include one or more of the following features. For example, an application status entry may be created that includes application status information for an internal state of the application after the received request is processed. A unique identifier value may be associated with the created application status entry. The created application status entry and the associated unique identifier value may be stored in persistent storage.

The request may be a request for a web page, and the unique identifier value may be a unique page identifier value. If so, the received request may be processed by creating the requested web page only after the internal state of the application is set based on the application status information of the identified application status entry.

The unique page identifier value associated with the application status entry may be sent to the web browser. One way to do so is to include the unique page identifier value as a hidden field on the created web page, so that the hidden field with the unique page identifier is sent to the web page when the created web page is sent.

The application status entry may be stored as a stack or a hash map. Storing the application status entry may include storing the application status entry both in a stack and using a hash map. The application may include a sales application.

In another general aspect, retrieving a dynamically generated web page more than once includes receiving a request to provide a dynamically generated web page. The requested web page is generated using selected state information to change a present state to a different present state. The selected state information used in the generation of the requested web page is determined by a computer program for generating the dynamically generated web page. The changed present state of the selected state information is stored for use in subsequently generating the same dynamically generated web page at a later time. The presently and subsequently dynamically generated web pages are identical in information content.

Implementations may include any of the features described above or one or more of the following features. For example, a unique page identifier is associated with selected state information and a dynamically generated web page. The unique page identifier is used to enable retrieval of a dynamically generated web page more than once.

Implementations of any of the techniques discussed above may include a method or process, a system or apparatus, or computer software on a computer-accessible medium.

Using stored application status information to reconstruct the internal state of a web application before the web application responds to a request for a web page helps to ensure that the web page generated and returned by a subsequent submission of a previous request returns the same page as previously returned, as expected by the user. In addition, storing application status information within the web application on the web server instead of transferring the application status information with the web page to the web browser may help to minimize the amount of bandwidth needed for the transmission. Storing the application status information with the web application on the web server (instead of with the web browser) also may help to prevent the user from accessing the application status information, which, in turn, may help to prevent accidental or malicious change of the application status information.

The details of one or more of the implementations are set forth in the accompanying drawings and description below. Other features will be apparent from the description and drawings, and from the claims.

DETAILED DESCRIPTION

Figure 1:
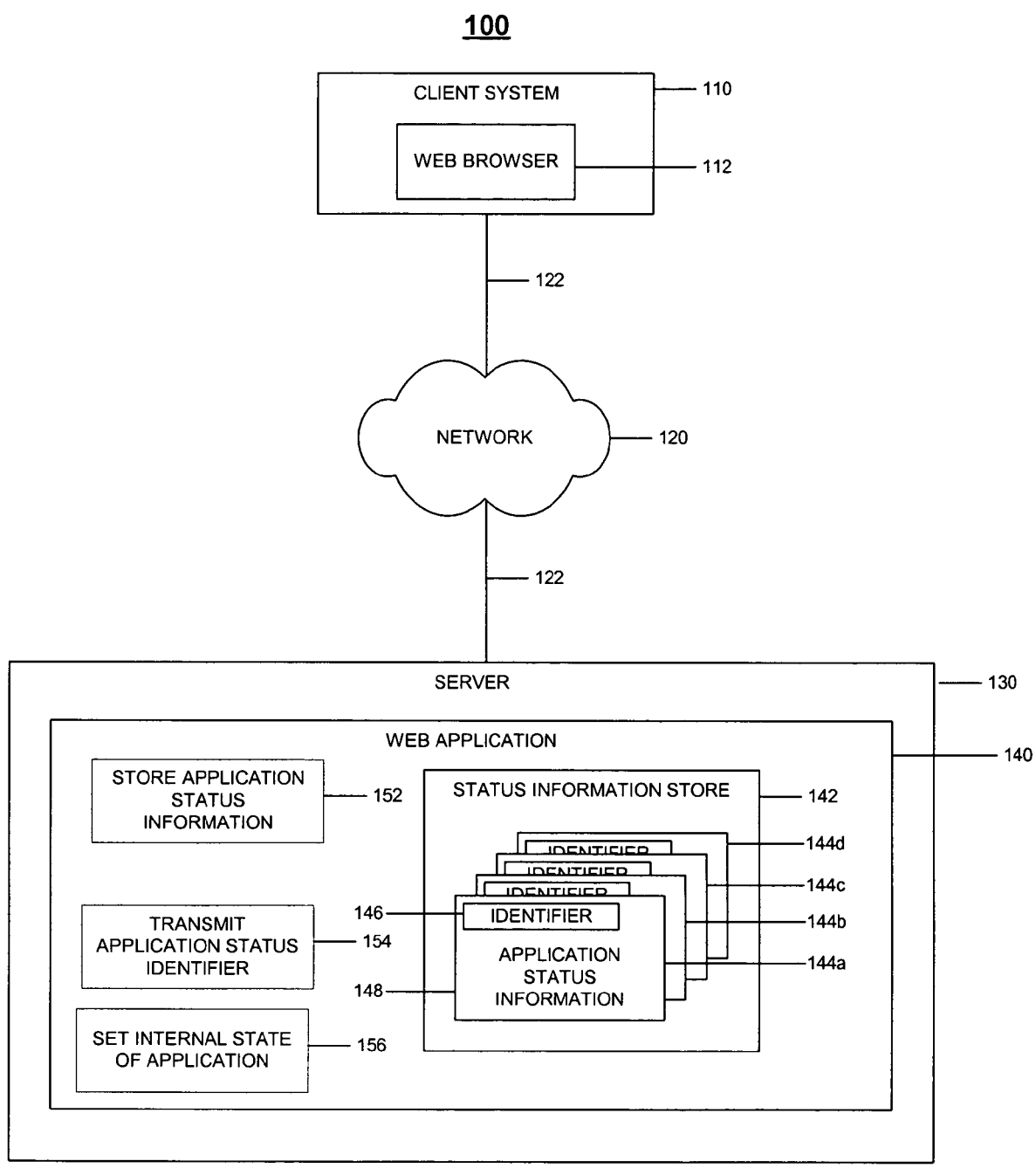
FIG. 1 is a block diagram of a system incorporating various aspects of the invention.

A computer system 100, shown in FIG. 1, is capable of storing and using status information of a web application in accordance with the invention. The computer system 100 includes a client system 110 having a web browser 112 that is used to access, through a network 120, a web server 130 having a web application 140 capable of dynamically generating web pages for transmission to the web browser. In general, the web application 140 stores application status information that is associated with each generated web page. The application status information is stored so that it may be later retrieved and used to reset the status of the web application each time requests are generated by action taken while the page is displayed. Resetting the status each time action is taken from the page ensures that the corresponding request produces the same results every time that it is submitted, as is expected by the user.

The client system 110 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. By way of example only, the client system 110 may be a desktop computer system, a laptop computer, a personal digital assistant (PDA) or a mobile telephone capable of communicating over a data network. One example of such a mobile telephone is a mobile telephone that is capable of using the i-Mode cellular telephone service available from NTT DoCoMo of Japan. An i-Mode cellular telephone is capable of accessing web sites that are developed using the Compact Wireless Mark-up Language (CWML). The client system 110 may receive instructions from, for example, a software application, a program, a piece of code, a device, a computer, a computer system, or a combination thereof, which independently or collectively direct operations, as described herein. These instructions may take the form of one or more communications programs that facilitate communications between the client system 110 and the server 130. For instance, such communications programs may include a web browser program 112 described more fully later. The instructions may be embodied permanently or temporarily in a machine, a component, a piece of equipment, a storage medium, or a propagated signal that is capable of being delivered to the client system 110.

The client system 110 includes a communications interface (not shown) used by the communications programs to send communications through the network 120. The communications may include, for example, e-mail, audio data, video data, general binary data, or text data (e.g., encoded in American Standard Code for Information Interchange (ASCII) format). The client system 110 also includes one or more input devices (also not shown), such as a keyboard, mouse, stylus, or microphone, as well as one or more output devices, such as a monitor, a touch screen, a speaker, or a printer.

The client system 110 also includes the web browser 112. The web browser 112 is a program running on the client system 110 that is operable to download and display information from the server 130 in response to user input at the client system 110. The web browser 112 submits requests for information to the server 130 through the network 120 and receives web pages in response, also through the network 120. The web browser 112 then displays the page from the web application 140. The web browser 112 enables a user of the client system 110 to navigate linearly forward and backward through the pages retrieved from the web application 140 and displayed by the web browser 112.

The network 120 typically includes a series of portals interconnected through a coherent system. Examples of the network 120 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), or a Digital Subscriber Line (DSL)), or any other wired or wireless network. The network 120 may include multiple networks or sub-networks, each of which may include, for example, a wired or wireless data pathway. The client system 110 is connected to the network 120 through various communication media 122, such as a modem connected to a telephone line (using, for example, serial line internet protocol (SLIP) or point-to-point protocol (PPP)) or a direct network connection (using, for example, the transmission control protocol/internet protocol (TCP/IP)).

As with the client system 110, the server 130 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The host server 130 may receive instructions from, for example, a software application, a program, a piece of code, a device, a computer, a computer system, or a combination thereof, which independently or collectively direct operations, as described herein. These instructions may take the form of one or more communications programs. The instructions may be embodied permanently or temporarily in a machine, a component, a piece of equipment, a storage medium, or a propagated signal that is capable of being delivered to host server 130. Further, the server 130 includes a communications interface (not shown) used by the communications programs to send communications through the network 120. The communications may include, for example, e-mail, audio data, video data, general binary data, or text data (e.g., ASCII format).

The server 130 includes a web application 140 that services requests received from the web browser 112. In general, as is conventional, upon receipt of the request, the server 130 passes the request to a web application capable of servicing the request, here the web application 140. The web application 140 services the request by creating a web page that includes the requested information and transferring the web page to the web browser 112 over the network 112.

In accordance with the invention, the web application 140 includes a status information store 142 in which application status snapshots 144a-144d are stored. Each application status snapshot 144a-144d includes an identifier 146 and application status information 148. The web application 140 only services a request received from the web browser 112 after setting the internal state of the web application 140 according to the application status information of one of the application status snapshots 144a-144d identified in the request received the web browser 112. This helps to enable that the web page returned in response to a request is consistent with user expectations, even when backward and subsequent forward navigation has occurred on the web browser 112.

The web application also includes a process 152 to store status information. The web application 140, before servicing a request, executes the process 152 to store information describing the status of the web application 140 in the status information store 142 that includes the application status snapshots 144a-144d. For example, before servicing a particular request, the web application 140 stores the current status as the application snapshot 144a. Each of the application status snapshots 144a-144d includes an identifier 146. In some implementations, the identifier 146 is a global unique identifier (GUID). In other implementations, the identifier 146 is specific to the web application 140. Each of the application status snapshots 144a-144d also includes application status information 148 from which the status of the application at the time at which the application status snapshot was stored may be reconstructed. The application status information 148 is information from which the internal status of the web application may be reconstructed. The application status information 148 is specific to the web application. For example, the application status information 148 may include the values of variables within the web application that define the internal status of the web application. As another example, the application status information 148 may include information describing the activity of the web application when the application status information was stored. More particularly, the application status information 148 may include a type of page that is being generated by the web application 140 as well as a query used to generate the page. The query may be a query into a database or some other request for information to be included in the page. The application status information 148 also may include the type of page being created and the results of the query being used to generate the page. Typically, storing the results of the query with the application status information 148 will require a larger amount of space than simply storing the query.

In one implementation, the application status snapshots 144a-144d are stored and indexed in the status information store 142 as a stack. In such an implementation, the last application snapshot that has been stored in the status information store 140 is the first application snapshot to be retrieved. Furthermore, for a particular application status snapshot, all other application status snapshots stored after the particular application status snapshot must be retrieved before the particular application status snapshot may be retrieved. Storing the application status snapshots 144a-144d as a stack imposes an ordering on the application status snapshots 144a-144d. Furthermore, backwards motion through the set of pages displayed by the web browser 112 corresponds to removing application status snapshots from the top of the stack. More particularly, moving back two pages and resubmitting a request for the resultant page corresponds to removing the top two application status snapshots from the top of the stack and using the application status snapshot currently at the top of the stack to reconstruct the status of the web application 140 prior to servicing the resubmitted request.

In another implementation, the application status snapshots 144a-144d are stored and indexed in the status information store 142 as a hash map. The hash map includes several buckets, and each of the application status snapshots 144a-144d is placed into a bucket. A hash function assigns the application status snapshots 144a-144d to a bucket based on the value of the corresponding identifiers 146. The application status snapshots 144a-144d are retrieved by using the identifier to determine the bucket in which the application status snapshots 144a-144d are stored. Storing the application status snapshots 144a-144d in a hash map enables quick access to the application status snapshots 144a-144d regardless of the order in which application status snapshots 144a-144d are stored in the status information store 142. In other implementations, the application status snapshots 144a-144d are stored and indexed in the status information store 142 both as a stack and as a hash map.

The web application 140 also includes a process 154 to transmit the identifier of an application status snapshot to the web browser 112 with the web page created in response to the request received from the web browser 112. This enables the web browser 112 to resubmit the identifier of an application status snapshot with a subsequent request from the received web page.

The web application 140 also includes a process 156 to set the internal state of the web application 140 to be equivalent of the state indicated by application status information in one of the application status snapshots 144a-144d. The web application 140 may use the process 154 to reconstruct the internal state of the web application 140 based on an identifier of an application status snapshot received with a request from the web browser 112.

Turning to an example of how processes 154 and 156 may be used, the web application 140, after storing an application status snapshot in the application status store 142, creates a web page in response to the request received from the web browser 112. The web page includes the identifier of the application status snapshot that has been stored. The web application uses the process 154 to send the web page that includes the identifier of the application status snapshot. The web page is displayed by the web browser 112. Other pages may be displayed subsequently by the web browser 112 in response to other user input. When the web browser 112 receives a user command while displaying the page received in response to the previous request, a new request for the page is submitted that includes the identifier of the application status snapshot that was stored when the page was first created. The web application 140 receives the request including the identifier and retrieves the corresponding application status snapshot. The web application 140 executes process 156 to reset its internal status to match what is specified by the application status snapshot and generates a page in response to the resubmitted request, which is sent to the web browser 112 for display.

In sum, the system 100 stores application status information so that it may be later retrieved and used to reset the status of the web application each time requests are generated by action taken while the page is displayed. Resetting the status each time action is taken from the page ensures that the corresponding request produces the same results every time that it is submitted, as is expected by the user.

Figure 2:
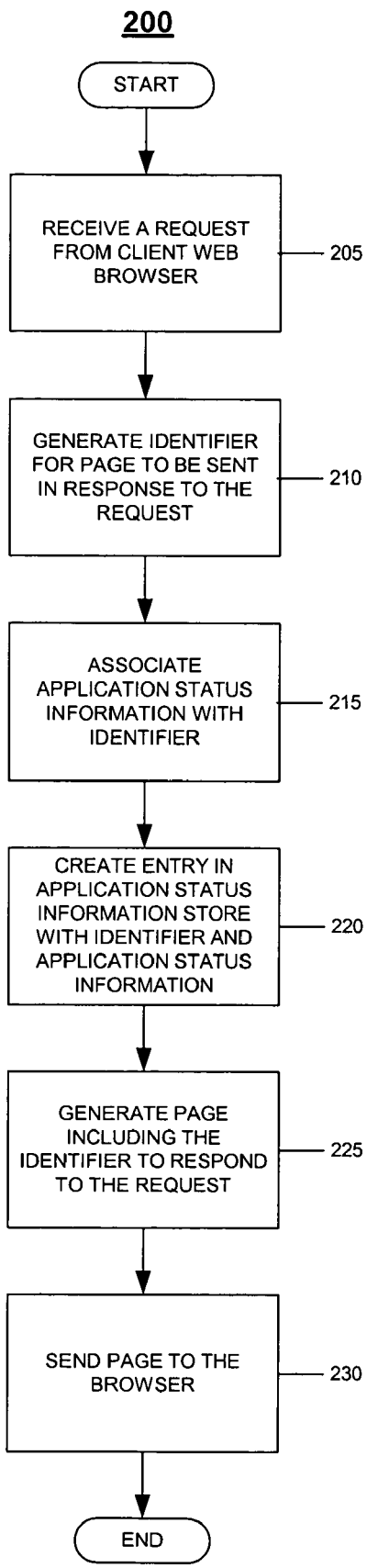
FIG. 2 is a flow chart of a process for storing status information of a web application.

FIG. 2 shows a process 200 for storing status information of a web application. The process 200 is executed by a processor or processors of a web server (such as server 130 in FIG. 1) on which a web application (such as web application 140 in FIG. 1) is running. For brevity, the actor of the process 200 may be referred to as a web application. The process 200 begins when the web application receives a request from a web browser (step 205). The request may be transmitted from the web browser and submitted to the web application 205 as a result of a user of a web browser selecting a link, submitting a form displayed in the web browser, or performing some other action indicating that a page from the web application is desired. The web application generates an identifier for a page to be sent to the client in response to the request (step 210). The identifier may be, for example, a GUID or an application specific identifier. Internal status information defining the current status of the web application is identified and associated with the identifier (step 215). The internal status information is information from which the current internal status of the web application may be reconstructed, as described previously. In one implementation, associating the internal status with the identifier includes creating an application status snapshot, such as the application status snapshots 144a-144d of FIG. 1.

The web application then creates an entry in an application status information store, such as the status information store 142 of FIG. 1, for the association of the identifier and the application status information (step 220). In implementations where the application information status store is organized as a stack, creating an entry for the identifier and the associated application status information includes placing the association on the top of the stack. In implementations where the application information status store is organized as a hash map, creating an entry for the identifier and the associated application status information includes using the hash function to determine the bucket into which the association is to be placed and then placing the association in that bucket.

The web application then generates a page including the identifier to respond to the original request (step 225), and the page is sent to the web browser for display (step 230). The page includes the identifier such that any requests generated from the page include the identifier. When receiving a request generated from the page, the web application uses the identifier to retrieve the application status information corresponding to the identifier and to reset the status of the web application to what is indicated by the application status information. When this is done, all requests generated from the page, regardless of what has been done between the requests, will be serviced by the web application with the same status. More particularly, if two substantially identical requests are generated from a page, then the web application will return substantially the same page in response to the requests, regardless of what has been done or displayed between the two requests.

In one implementation, a page generated by the web application by default includes a form, and the form includes a hidden field in which the identifier corresponding to the page is specified. An action performed while interacting with the page may generate a request for the web application. For example, a request may be generated from the page through selection of a link on the page or submission of a form on the page. However, instead of simply submitting the request, the action causes the execution of a function, such as a Javascript function. When executed, the function submits the default form including the identifier, which instructs the web application to retrieve the application status information corresponding to the identifier and to reset the status of the web application to what is indicated by that application status information. The function submits the default form with information indicating an action requested by a user.

For example, when a link is selected, a function is executed. Similarly, submitting a form starts the execution of a function. The function may check that the identifier associated with application status information and information about the action requested by the user is transported to the server. When the web application gets the submitted form as a request from the web browser, the web application first resets its internal status according to the received identifier and then processes the incoming request.

In another implementation, a hidden field including the identifier may be placed into all forms on the page. When any of the forms are submitted, then the identifier is also given to the web application. The web application then is able to reset the status of the web application to what is indicated by the application status information corresponding to the identifier before processing the other fields of the form.

In another implementation, the name of the page linked to with a link is augmented with the identifier. For example, in an implementation where the page is specified with hypertext markup language (HTML), a link that is specified by "<a href="http://www.server.com/page.html">" may be replaced with a link that is specified by "<a href="http://www.server.com/page.html?identifier=12345">." After receiving an augmented page name, the web application may extract the identifier from the page name and reset the status of the web application to what is indicated by the application status information corresponding to the identifier before retrieving or generating the indicated page.

Figure 3:
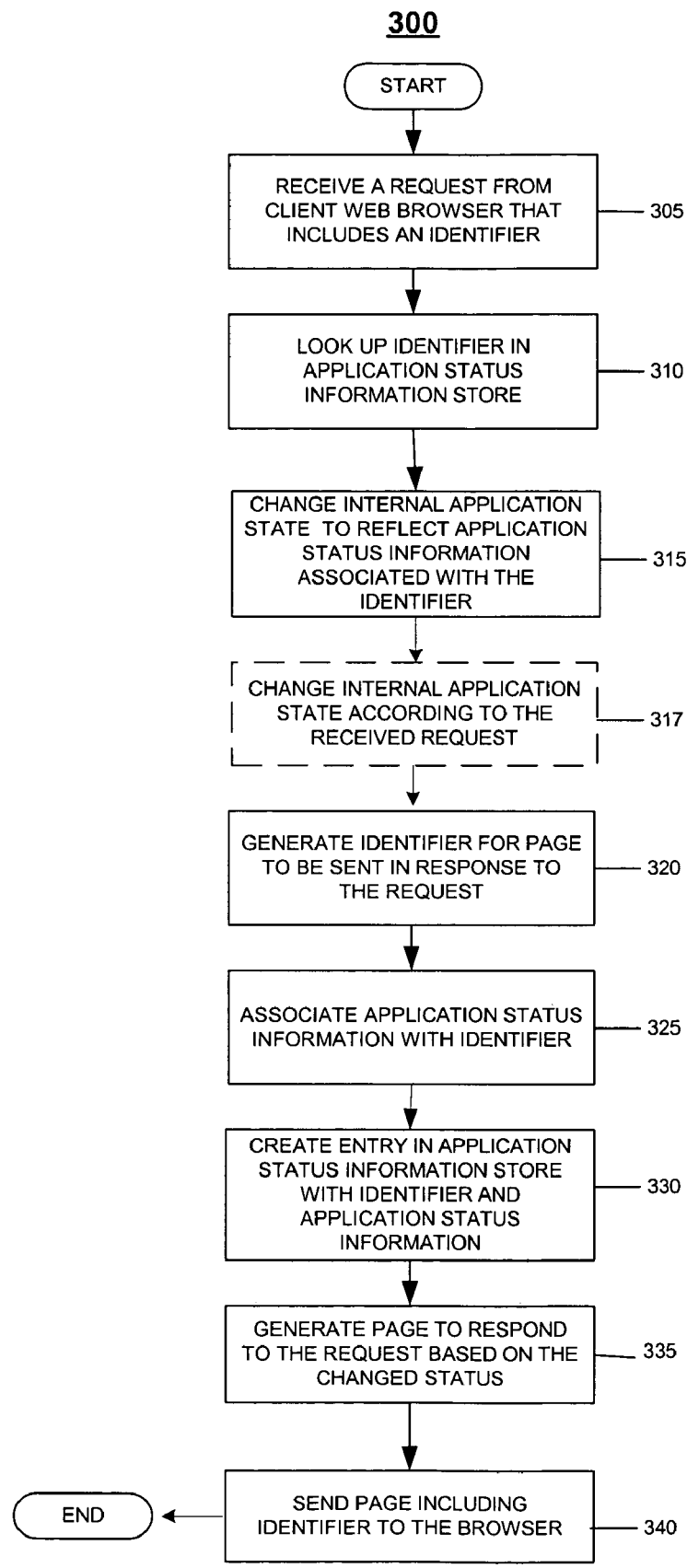
FIG. 3 is a flow chart of a process for retrieving and using stored web application status information.

FIG. 3 depicts a process 300 for retrieving and using stored web application status information. The process 300 executed by a processor or processors of a web server (such as server 130 in FIG. 1) on which a web application (such as web application 140 in FIG. 1) is running. In general, the process 300 is executed by a web application when a request for a page from the web application is received. The request is generated as a result of interaction with a page that includes an identifier of application status information. The request also includes the identifier for application status information that is used to reset the status of the web application before the request is serviced. Resetting the status of the web application each time a request is received due to interaction with the page ensures that the web application is in the same state and produces the same results every time that the request from the page is serviced, as is expected by the user.

The process 300 begins when a request from a web browser is received (step 305). The request includes an identifier of application status information that is stored within an application status information store, such as the status information store 142 having application status snapshots 144a-144d of FIG. 1. The web application looks up the identifier in the status information store (step 310). In implementations where the application status information store is organized as a stack, locating the identifier includes removing application status snapshots from the stack until an application status snapshot with an identifier that matches the identifier received with the request is on the top of the stack. In implementations where the application status information store is organized as a hash map, locating the identifier includes using the hash function to identify the bucket into which the applications status snapshot has been placed and then searching the bucket for the application status snapshot having an identifier that matches the received identifier.

The internal state of the web application is changed to reflect the application status information associated with the identifier received with the request (step 315). To do so, the application status information is retrieved from the application status information store after the identifier corresponding to the application status information is found in the application status information store. With the status reset, the web application may respond to the request in the same manner as when requests received from the page after the page was first generated. The processor also may change the internal application state according to the received request (step 317). In some cases, a change is not necessary to the internal application state, and, when a change is not necessary, steps 320-330 need not necessarily be performed.

More particularly, the request is serviced in a similar way as is done in process 200 in FIG. 2 for storing status information. An identifier for the page to be sent in response to the request is generated (step 320). Current application status information is identified and associated with the generated identifier (step 325). An entry is created in the application status information store to associate the identifier and the application status information (step 330). The web application then generates a page, including the identifier, to be sent in response to the request (step 335), and the page is sent to the web browser for display (step 340).

Figure 4A:
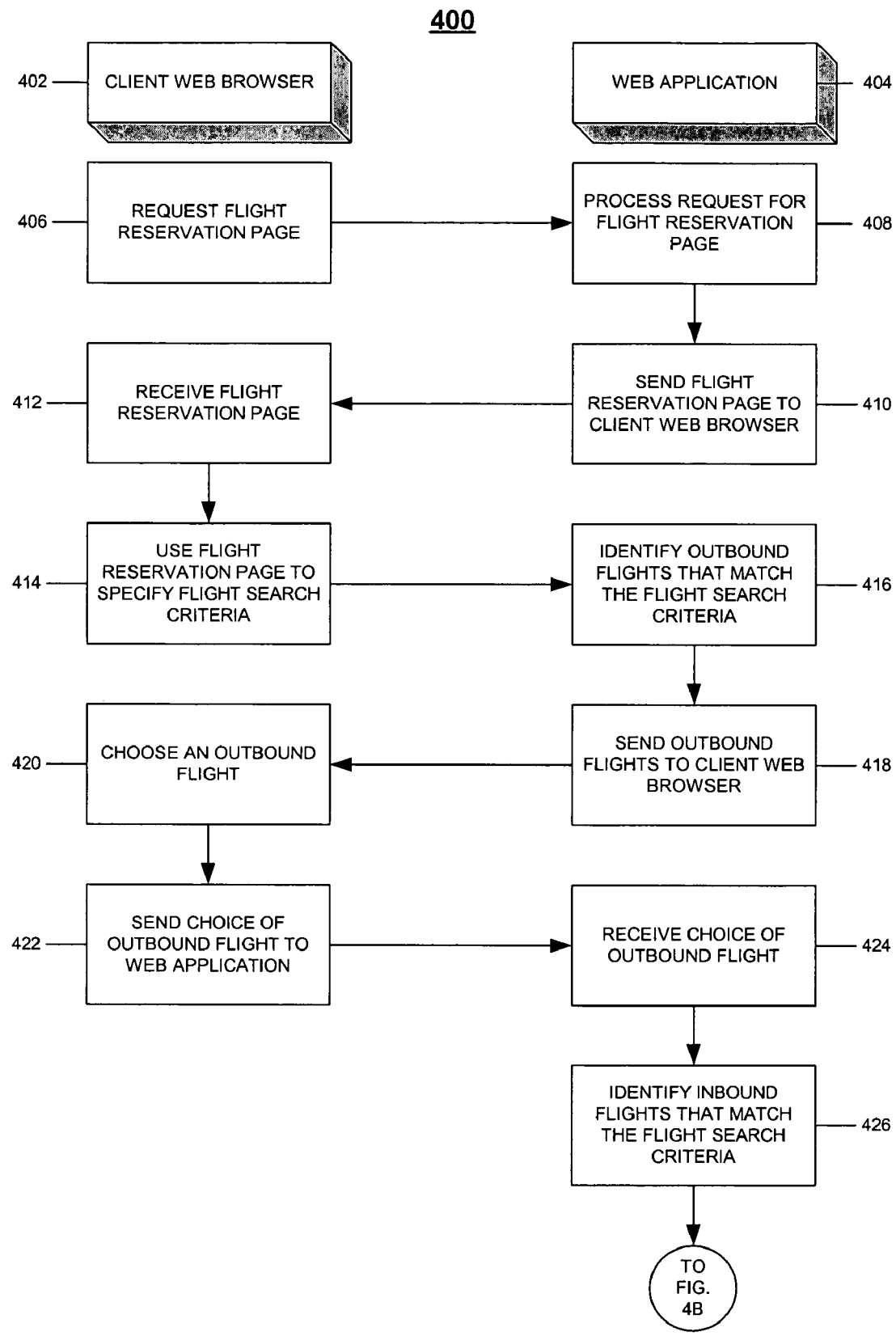
FIGS. 4A and 4B are diagrams of a process for using application status information when navigating through a set of pages from a web application with a web browser.
Figure 4B:
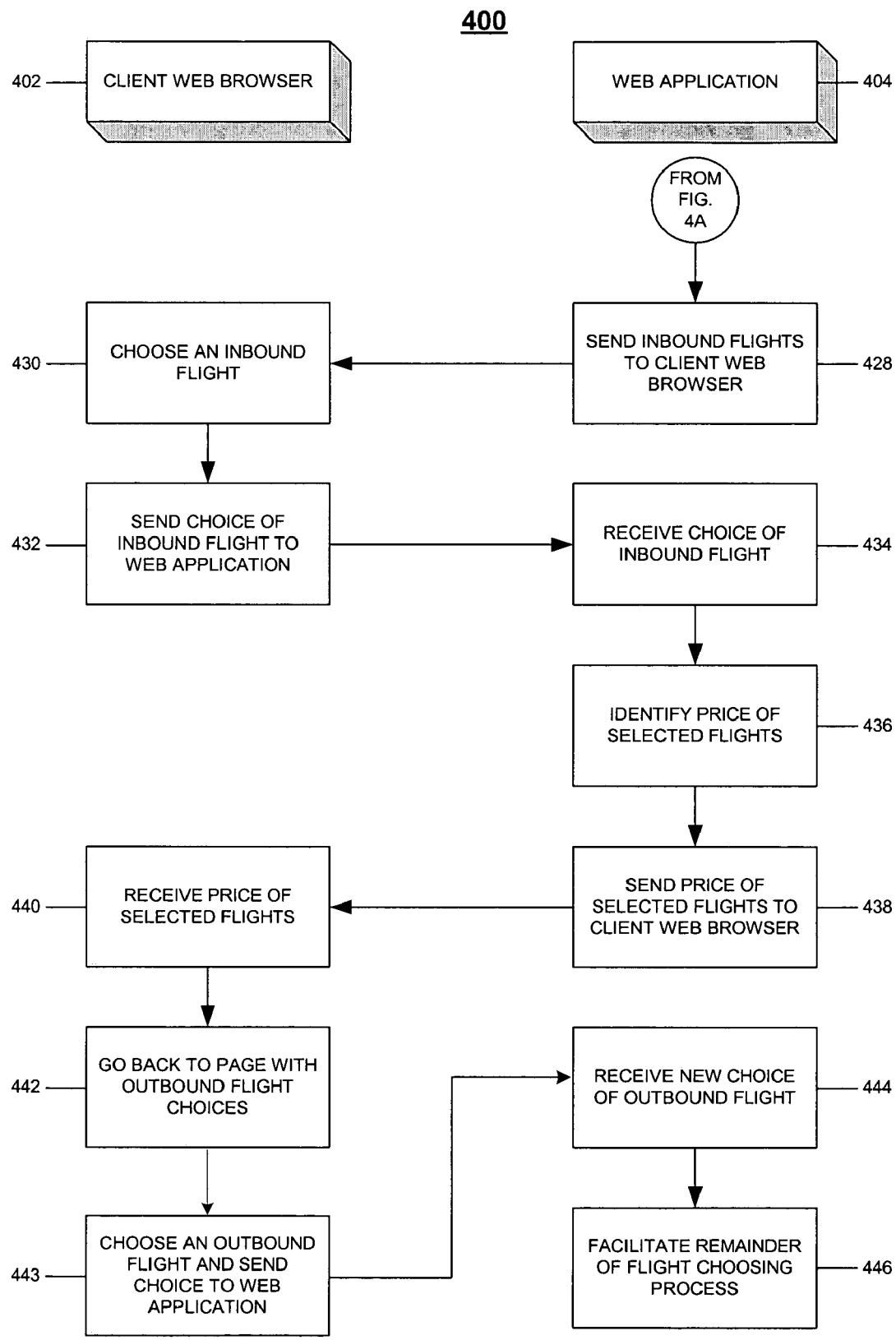

FIGS. 4A and 4B illustrate a navigation process 400 for using application status information when navigating, with a web browser, through a set of pages from a web application. Referring also to FIGS. 5A-5E, an example of web application status information that is stored and used during the navigation process 400 of FIG. 4 is illustrated. In the example of FIGS. 4A, 4B and 5A-5E, the web application status information stored during the navigation process 400 is stored as a stack. The navigation process 400 involves a web browser 402 that is requesting and displaying pages from a web application 404. By way of example, the web application 404 may be an application for making airline flight reservations. A user of the web browser 402 accesses the web application 404 to choose flights and make a reservation. The web browser may be an implementation of the web browser 112 in FIG. 1, and the web application may be an implementation of the web application 404 in FIG. 1.

Figure 5A:
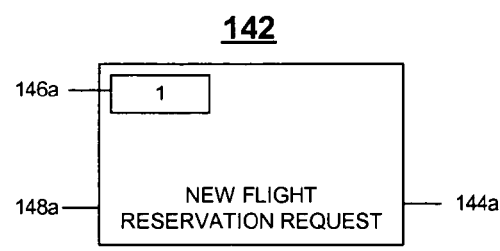
FIGS. 5A-5E are block diagrams of web application status information stored and used during the navigation process of FIG. 4.

The navigation process 400 begins when the web browser 402 submits a request for the main flight reservation page from the web application 404 (step 406). This may be accomplished, for example, by a user of the web browser entering the address of the main flight reservation page in the web browser and entering a command (such as "go") in the web browser to request the main flight reservation page from the web application 404. The web application 404 receives and processes the request for the main flight reservation page (step 408). Processing the request from the web browser 402 may include executing a process similar to the process 200 of FIG. 2. The web application stores application status information at the time when the request is serviced in an application status information store, such as the application information status store 142 of FIG. 1. The contents of the application status information store 142 are illustrated in FIG. 5A. The application information status store 142 includes a single application status snapshot 144a that describes the status of the web application 404 at the time when the application status snapshot was stored. The application status snapshot 144a includes an identifier 146a, which is "1" in this case, as well as application status information 148a that indicates that the web application 404 has received a request to create a new flight reservation.

Referring again to FIG. 4A, after the status information has been stored, the web application builds the main flight reservation page. The main flight reservation page includes the identifier 146a of the application status snapshot 144a, and all requests sent to the web application as a result of using the page will include the identifier 146a. The main flight reservation page is sent to the web browser (step 410). The web browser receives the flight reservation page (step 412), and the user uses the flight reservation page to specify and submit flight search criteria that define the flights desired by the user of the web browser 402 (step 414). For example, submitting the entered flight search criteria may include submitting a form on the main flight reservation page with fields for the dates and times during which outbound and inbound flights may be taken. The entered flight search criteria are packaged into a request for potential outbound flights that includes the identifier 146a included in the main flight reservation page. The request is sent to the web application 404, and the web application retrieves the application status information corresponding to the identifier 146a that is found in the request. The corresponding application status information is the same as the current status of the web application, so no change to the current status of the web application is needed.

Figure 5B:
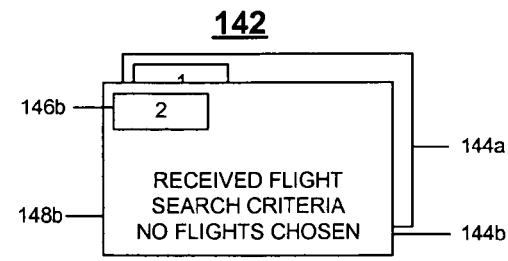

The web application 404 uses the search criteria to identify outbound flights that match the flight search criteria (step 416). While identifying the outbound flights that match the flight search criteria, the web application 404 stores application status information at the time when the flight search criteria are received in the application status information store. FIG. 5B illustrates the application status information store 142 at this point. The application status information store 142 includes a second application status snapshot 144b with an identifier 146b of "2" and application status information 148b indicating that the web application 404 has received flight search criteria but that no flights have been chosen yet. Since the status information store 142 is organized as a stack, the application status snapshot 144b must be accessed before the application status snapshot 144a may be accessed.

Referring again to FIG. 4A, the web application 404 formats the identified outbound flights into a page that is sent back to the web browser 402 (step 418). The page includes the identifier 146b of the application status snapshot 144b, and all requests that are sent to the web application as a result of using the page will include the identifier 146b. A user of the web browser 402 chooses an outbound flight from the flights listed on the page received from the web application 404 (step 420). Choosing an outbound flight may include selecting a link next to a listing on the page for the outbound flight. The chosen outbound flight is packaged into a request for potential inbound flights that also includes the identifier 146b included in the outbound flights page page. The choice of the outbound flight is sent to the web application 404 in the request (step 422), and the web application 404 receives the choice of the outbound flight (step 424). The web application retrieves the application status information corresponding to the identifier 146b that is found in the request. The corresponding application status information is the same as the current status of the web application, so no change to the current status of the web application is needed.

Figure 5C:
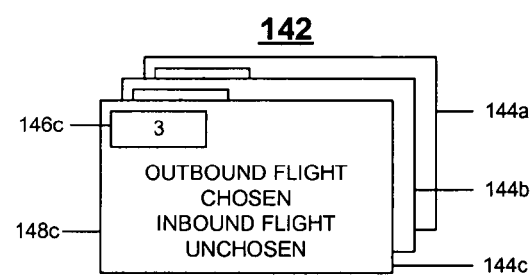

In response to the request for potential inbound flights, the web application 404 identifies the inbound flights that match the received flight search criteria (step 426). In doing so, the web application 404 stores application status information after the outbound flight choice is received in the application status information store. FIG. 5C illustrates the application status information store 142 at this point. The application status information store 142 includes an application status snapshot 144c with an identifier 146c of "3" and application status information 148c indicating that the web application 404 has received an outbound flight choice but not an inbound flight choice. The application status snapshot 144c is placed on the top of the stack within the status information store 142.

Referring again to FIG. 4B, the web application 404 formats the identified inbound flights into a page that is sent back to the web browser 402 (step 428). The page includes the identifier 146c of the application status snapshot 144c, and all requests sent to the web application as a result of using the page will include the identifier 146c. A user of the web browser 402 chooses an inbound flight from the flights listed on the page received from the web application 404 (step 430). Choosing an inbound flight may include selecting a link next to a listing on the page for the inbound flight. The chosen inbound flight is packaged into a request for the price of the flights that includes the identifier 146c included in the inbound flights page. The choice of the inbound flight is sent to the web application 404 in the request (step 432), and the web application 404 receives the choice of the inbound flight (step 434). The web application 404 retrieves the application status information corresponding to the identifier 146c that is found in the request. The corresponding application status information is the same as the current status of the web application, so no change to the current status of the web application is needed.

Figure 5D:
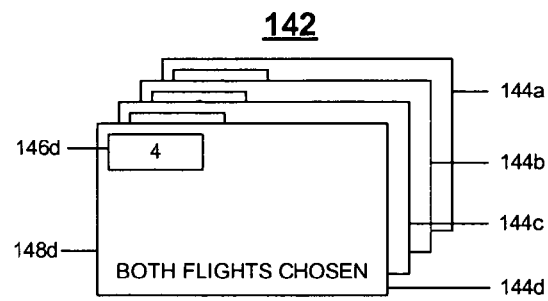

In response to the request for the price of the selected flights, the web application 404 determines the price of the selected pair of flights (step 436). In doing so, the web application stores application status information at the time when the inbound flight choice and price request is received in the application status information store. FIG. 5D illustrates the application status information store 142 at this point. The application status information store 142 includes an application status snapshot 144c with an identifier 146d of "4" and application status information 148d indicating that both an inbound and an outbound flight have been chosen. The application status snapshot 144d is placed on the top of the stack within the status information store 142.

Referring again to FIG. 4B, the web application 404 formats the identified price into a page that is sent back to the web browser 402 (step 438), and the page is received by the web browser 402 (step 440). The page includes the identifier 146d of the application status snapshot 144d, and all requests sent to the web application as a result of using the page will include the identifier 146d. A user of the web browser 402 may not approve of the price displayed on the page and may wish to select different outbound and inbound flights to find a more satisfactory price. To do so, the user of the web browser may indicate the desire to go back two pages to choose a different outbound flight (step 442). A user of the web browser 402 chooses a different outbound flight and the choice of the outbound flight is sent to the web application 404 in the request (step 443), as described previously in steps 420 and 422. The new choice of outbound flight is received by the web application 404 (step 444). The web browser 402 sends along with the choice of outbound flight the identifier of the application status snapshot that was stored when the page with the possible outbound flights was created. In this example, the identifier is "2."

Figure 5E:
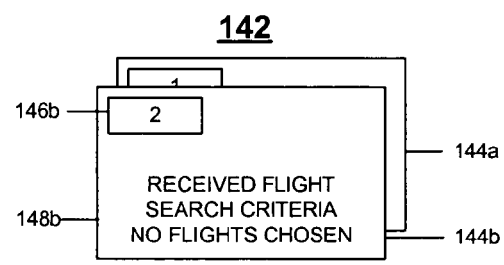

After receiving the identifier and the choice of the outbound flight, the web application 114 retrieves the application status snapshot that corresponds to the received identifier. The application status snapshot 144b corresponds to the received identifier. Because the application status snapshots 144a-144d are stored as a stack, the application status snapshots 144c and 144d are removed from the stack before the application status snapshot 144b may be retrieved. FIG. 5E shows the contents of the application status store 142 after the application status snapshots 144c and 144d have been removed. The application status information store 142 illustrated in FIG. 5E is substantially the same as the application status information store 142 illustrated in FIG. 5B.

The web application 404 resets its internal status to be what is indicated by the application status information 148b of the retrieved application status snapshot 144b. Therefore, the status of the web application 404 indicates that no flights have been chosen, even though outbound and inbound flights have been chosen. This is correct, because the previous choices have been discarded due to a lack of satisfaction with the corresponding price. The web application 404 then processes the outbound flight and continues to facilitate the rest of the flight choosing process, storing application status information each time a request is received (step 446).

A web browser is used throughout as a means for displaying requesting and displaying pages from a web application for purposes of clarity and consistency of description. However, any program capable of requesting, receiving, and displaying material may be used in conjunction with an information source that stores internal status information. Similarly, the Internet is used throughout as the network between the web browser and the web application, but any kind of network, including an intranet, may be used to connect the web browser and the web application. A web browser also may be called a network browser.

A number of implementations of the invention have been described. Nevertheless, it will be understood that various modifications may be made without departing from the spirit and scope of the invention. Accordingly, other implementations are within the scope of the following claims.

What is claimed is:

1. A computer-implemented method for processing a request received from a network browser, the method comprising:
   receiving a request generated by a network browser, the network browser being used to access a network server having an application accessible to the network browser and the request including a unique identifier value that identifies an application status entry;
   identifying the application status entry that includes a unique identifier value that matches the received unique identifier value, the application status entry including application status information related to the application;
   using the application status information included in the identified application status entry to set a status of the application;
   processing the received request only after the status of the application is set based on the application status information of the identified application status entry; and
   sending, to the network browser, a result based on processing the received request, the result capable of being rendered by the network browser.

2. The method of claim 1 further comprising:
   creating an application status entry that includes application status information for a status of the application after processing the received request;
   associating a unique identifier value with the created application status entry; and
   storing the created application status entry and the associated unique identifier value in persistent storage.

3. The method of claim 2 wherein storing the created application status entry comprises storing the application status entry in a stack.

4. The method of claim 2 wherein storing the created application status entry comprises storing the application status entry using a hash map.

5. The method of claim 2 wherein storing the created application status entry comprises storing the application status entry both in a stack and using a hash map.

6. The method of claim 1 wherein:
   the network browser comprises a web browser,
   the request comprises a request for a web page,
   the unique identifier value comprises a unique page identifier value, and
   processing the received request comprises processing the received request by creating a requested web page only after the internal state of the application is set based on the application status information of the identified application status entry.

7. The method of claim 6 further comprising sending the unique page identifier value associated with the application status entry to the web browser.

8. The method of claim 7 wherein:
   creating the requested web page comprises including the unique page identifier value as a hidden field on a created web page, and
   sending the unique page identifier value comprises sending the created web page that includes the unique page identifier value as a hidden field.

9. The method of claim 1 wherein the application comprises a sales application.

10. A computer-readable medium having embodied thereon a computer program including instructions that, when executed, process a request received from a network browser, the computer program configured to:

receive a request generated by a network browser, the network browser being used to access a network server having an application accessible to the network browser and the request including a unique identifier value that identifies an application status entry, identify the application status entry that includes a unique identifier value that matches the received unique identifier value, the application status entry including application status information related to the application, use the application status information included in the identified application status entry to set a status of the application, process the received request only after the status of the application is set based on the application status information of the identified application status entry, and send, to the network browser, a result based on processing the received request, the result capable of being rendered by the network browser.

11. The computer program of claim 10 further configured to:

create an application status entry that includes application status information for a status of the application after processing the received request, associate a unique identifier value with the created application status entry, and store the created application status entry and the associated unique identifier value in persistent storage.

12. A system for processing a request received from a network browser, the system comprising a processor connected to a storage device and one or more input/output devices, wherein the processor is configured to:

receive a request generated by a network browser, the network browser being used to access a network server having an application accessible to the network browser and the request including a unique identifier value that identifies an application status entry, identify the application status entry that includes a unique identifier value that matches the received unique identifier value, the application status entry including application status information related to the application, use application status information included in the identified application status entry to set a status of the application, process the received request only after the status of the application is set based on the application status information of the identified application status entry, and send, to the network browser, a result based on processing the received request, the result capable of being rendered by the network browser.

13. The system of claim 12 wherein the processor is further configured to:

create an application status entry that includes application status information for a status of the application after processing the received request, associate a unique identifier value with the created application status entry, and store the created application status entry and the associated unique identifier value in persistent storage.

14. A method comprising:

receiving a request to provide a dynamically generated web page, the request having been generated by a network browser used to access a network server having an application accessible to the network browser, generating the requested web page using selected state information to change a present state to a different present state, the selected state information used in the generation of the requested web page being determined by a computer program for generating the dynamically generated web page; and storing the changed present state of the selected state information for use in subsequently generating the same dynamically generated web page at a later time, such that the presently and subsequently dynamically generated web pages are identical in information content.

15. The method of claim 14 further comprising:

associating a unique page identifier with selected state information and a dynamically generated web page; and using the unique page identifier to enable retrieval of a dynamically generated web page more than once.

16. A computer-readable medium having embodied thereon a computer program including instructions that, when executed, retrieve a dynamically generated web page more than once, the computer program configured to:

receive a request to provide a dynamically generated web page;

generate the requested web page using selected state information to change a present state to a different present state, the selected state information used in the generation of the requested web page being determined by a computer program for generating the dynamically generated web page; and store the changed present state of the selected state information for use in subsequently generating the same dynamically generated web page at a later time, such that the presently and subsequently dynamically generated web pages are identical in information content.

17. The computer program of claim 16 further configured to:

associate a unique page identifier with selected state information and a dynamically generated web page, and use the unique page identifier to enable retrieval of a dynamically generated web page more than once.

18. A system comprising a processor connected to a storage device and one or more input/output devices, wherein the processor is configured to:

receive a request to provide a dynamically generated web page;

generate the requested web page using selected state information to change a present state to a different present state, the selected state information used in the generation of the requested web page being determined by a computer program for generating the dynamically generated web page; and store the changed present state of the selected state information for use in subsequently generating the same dynamically generated web page at a later time, such that the presently and subsequently dynamically generated web pages are identical in information content.

19. The system of claim 18 wherein the processor is further configured to:

associate a unique page identifier with selected state information and a dynamically generated web page, and use the unique page identifier to enable retrieval of a dynamically generated web page more than once.

* * * * *